United States Patent [19]

Balog

[11] Patent Number: 4,683,108
[45] Date of Patent: Jul. 28, 1987

[54] LOCKING SCREW APPARATUS AND METHOD FOR UNDERWATER REMOTE REPLACEMENT

[75] Inventor: Leonard J. Balog, Murrysville Boro, Pa.

[73] Assignee: Westinghouse Electric Corp., Pittsburgh, Pa.

[21] Appl. No.: 807,143

[22] Filed: Dec. 10, 1985

[51] Int. Cl.[4] .................. G21C 19/00; F16B 39/10
[52] U.S. Cl. ............................. 376/260; 376/399; 376/463; 403/408.1; 411/121; 29/400 N
[58] Field of Search ............... 376/260, 446, 463, 302, 376/303, 304, 399, 377; 403/408, 316; 411/121-124, 926, 927, 927.1, 113; 285/92; 29/400 N

[56] References Cited

U.S. PATENT DOCUMENTS

| 117,517 | 8/1871 | Connel . | |
|---|---|---|---|
| 272,971 | 2/1883 | Moored . | |
| 469,602 | 2/1892 | Shaw . | |
| 670,359 | 3/1901 | Jenkins . | |
| 706,409 | 8/1902 | Hart . | |
| 727,314 | 5/1903 | Duffy . | |
| 732,166 | 6/1903 | Callahan . | |
| 890,339 | 6/1908 | Cooper . | |
| 915,642 | 3/1909 | Wilson . | |
| 939,048 | 11/1909 | Martin . | |
| 955,577 | 4/1910 | Bradshaw . | |
| 976,928 | 11/1910 | Salisbury . | |
| 1,256,085 | 2/1918 | Watts | 411/121 |
| 1,374,054 | 4/1921 | Bridge . | |
| 1,410,812 | 3/1922 | Joberty . | |
| 1,512,551 | 10/1924 | McDonald . | |
| 1,582,094 | 4/1926 | Sweet . | |
| 1,621,854 | 3/1927 | Saloun . | |
| 2,363,319 | 11/1944 | Hanson . | |
| 3,420,287 | 1/1969 | McCormick | 411/121 |
| 4,069,102 | 1/1978 | Berringer et al. | 376/463 |
| 4,105,058 | 8/1978 | Bunn et al. | 411/113 |
| 4,139,315 | 2/1979 | Levy et al. | 376/463 |
| 4,302,294 | 11/1981 | Leclercq | 376/446 |
| 4,303,476 | 12/1981 | Leclercq | 376/446 |
| 4,346,734 | 8/1982 | Frank | 411/121 |
| 4,394,096 | 7/1983 | Stevens | 403/408.1 |
| 4,452,755 | 6/1984 | Hylton | 376/446 |
| 4,583,897 | 4/1986 | Briles | 403/408.1 |

FOREIGN PATENT DOCUMENTS

| 0026141 | 4/1981 | European Pat. Off. | 376/463 |
|---|---|---|---|
| 0098774 | 1/1984 | European Pat. Off. | 376/353 |
| 147785 | 3/1903 | Fed. Rep. of Germany . | |
| 657344 | 5/1935 | Fed. Rep. of Germany . | |
| 872893 | 2/1953 | Fed. Rep. of Germany . | |
| 2042312 | 12/1971 | Fed. Rep. of Germany . | |
| 2739644 | 3/1978 | Fed. Rep. of Germany . | |
| 954580 | 6/1949 | France . | |
| 8516294 | 4/1985 | France . | |
| 950553 | 2/1964 | United Kingdom . | |
| 2103323 | 5/1985 | United Kingdom . | |
| 626259 | 8/1978 | U.S.S.R. . | |

Primary Examiner—Deborah L. Kyle
Assistant Examiner—Daniel Wasil
Attorney, Agent, or Firm—L. A. DePaul

[57] ABSTRACT

An apparatus and method for under water remote replacement of the screws which secure together first and second structures in the internal region of a nuclear reactor core, wherein the screws are received and counterbored screw bores in the first structure. First, one or more lateral recesses are machined in the side wall of the counterbore portion. Then an external hex head screw with a shoulder flange is inserted in the screw bore and is threadedly engaged with the second structure with the flange seated in the counterbore portion. A locking cup with a central hex opening is fitted over the hex head of the bolt in the counterbore portion. Then a bifurcated die is seated against the first structure with die fingers extending into the cup, and a drive member is driven through the die coaxially with the screw to move the die fingers against the side wall to deform it into the recesses, thereby locking the assembly in place.

20 Claims, 6 Drawing Figures

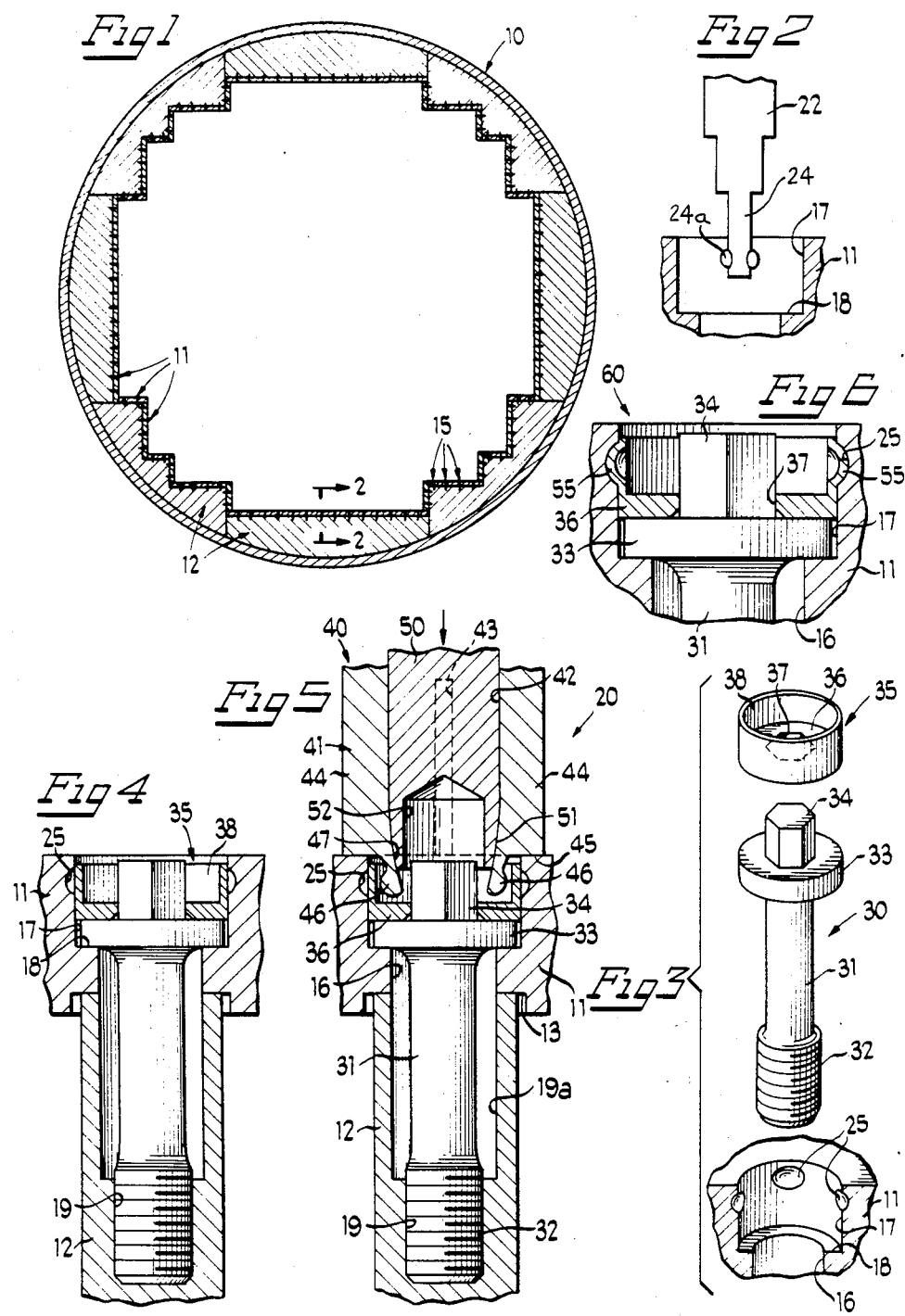

LOCKING SCREW APPARATUS AND METHOD FOR UNDERWATER REMOTE REPLACEMENT

BACKGROUND OF THE INVENTION

1. Field of the Invention

The present invention relates to an apparatus and method for locking screws so as to capture them and prevent their loosening. The invention has particular application to the remote underwater replacement and locking of the screws, such as those which secure the baffle plates to the former plates or the former plates to the core barrel in the internal region of a nuclear reactor core.

2. Description of the Prior Art

In a nuclear reactor the core assembly is disposed within a cylindrical core barrel and, more particularly, is confined within a zig-zag array of baffle plates which are spaced inwardly from the core barrel side wall. The space between the baffle plates and the core barrel side wall is closed by a plurality of vertically spaced-apart former plates. The baffle plates are secured to the former plates by a plurality of locking screw assemblies. Typically, the screws are received through complementary bores in the baffle plate and threadedly engaged with the former plate, the screw head being recessed in a counterbore portion of the screw bore. The screw heads are generally lock welded in place on the baffle plate.

Occasionally, the baffle plate screws become distressed in use and must be removed and replaced. Such replacement is complicated by the fact that the baffle plates are now underwater in an irradiated environment. Therefore, remote replacement of the screws is essential. Because the work is done underwater, the replacement screws cannot be readily lock welded in place, as were the original screws. Furthermore, the environment does not permit extensive machining of the baffle plates. Nevertheless, it is desirable that the replacement bolts be locked in place with a so-called "Class A locking device", i.e., one which not only prevents loosening of the screw, but also captures the screw head and prevents it from becoming a loose part in the event that the screw shank should break.

At present, no satisfactory technique exists for locking replacement screws in place with a Class A locking device. Prior locking arrangements for screw or bolt assemblies are known, but these prior arrangements include a portion to be folded up against a nut or screw head after tightening of the screw or bolt. Such arrangements require lateral access to the locking device to effect the folding or bending operation. Therefore, these arrangements would not be suitable for use in applications where the screw head is recessed in the counterbore.

One type of screw locking technique which has been considered involves the machining of an annular groove around the counterbore of the screw bore, leaving a thin web of baffle plate material separating the groove from the counterbore portion of the screw bore. A staking tool would then be inserted in the groove to deform the web material into a notch or recess in the screw head. Such an approach has several disadvantages. First of all, it involves significant machining of the surface of the baffle plate, which frequently becomes embrittled due to reactor core exposure. Furthermore, if a mistake is made in the machining operation, it would be very difficult to redo or repair.

SUMMARY OF THE INVENTION

It is a general object of the invention to provide an improved locking screw assembly which avoids the disadvantages of prior assemblies while affording additional structural and operating advantages.

An important object of the invention is the provision of a locking screw assembly which is of relatively simple construction and which leads itself to remote underwater application.

Another important object of the invention is the provision of a locking screw assembly of the type set forth, which results in a Class A locking of the screw head.

Yet another object of the invention is the provision of a locking screw assembly of the type set forth which is applicable to securing together two structures in the internal region of a nuclear reactor core, which assembly requires only minimal machining and which requires no machining of the exposed irradiated surfaces of the structures.

Still another object of the invention is the provision of a method for installing the locking screw assembly of the type set forth.

In connection with the foregoing object, it is another object of the invention to provide a method of the type set forth which can easily be repaired or corrected in the event a mistake is made.

In connection with the foregoing objects, another object of the invention is the provision of apparatus for performing the method.

Certain ones of these and other objects of the invention are attained by providing a locking screw assembly for securing together first and second structures in the internal region of a nuclear reactor core, wherein the first structure has a screw bore therethrough with a counterbore portion, the assembly comprising: a lateral recess formed in the counterbore portion, an elongated screw receivable in the screw bore for threaded engagement with the second structure, the screw having an enlarged shoulder flange dimensioned for seating in the counterbore portion and a drive head projecting axially from the shoulder flange and having a lateral width substantially less than that of the counterbore portion, and a locking member disposed in the counterbore portion against the shoulder flange and around the drive head for engagement therewith to prevent rotation with respect thereto, the locking member having a lateral projection engaged in the recess to prevent movement of the locking member with respect to the first structure.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a horizontal sectional view through a nuclear reactor core barrel, illustrating the attachment of the baffle plates to the former plates;

FIG. 2 is an enlarged fragmentary view in vertical section taken along the line 2—2 in FIG. 1 and rotated 90° clockwise, and illustrating one of the screw bores in the baffle plate with the screw removed and also illustrating a machining tool for use in performing the method of the present invention;

FIG. 3 is a fragmentary, exploded, perspective view of the locking screw assembly of the present invention;

FIG. 4 is an enlarged sectional view similar to FIG. 2, illustrating the parts assembled in a screw bore of the baffle plate, but prior to staking;

FIG. 5 is a view similar to FIG. 4, and illustrating the operation of the staking assembly; and FIG. 6 is a further enlarged fragmentary view similar to FIG. 5, and illustrating the completed locking screw assembly of the present invention.

DESCRIPTION OF THE PREFERRED EMBODIMENT

Referring to FIG. 1, there is generally designated by the numeral 10 the core barrel of a nuclear reactor. Typically, there will be disposed within the core barrel 10 a fuel core assembly (not shown) of known construction, which is confined between upper and lower core plates. The core assembly is peripherally enclosed within a baffle comprising a zig-zag array of a plurality of baffle plates 11, with each baffle plate 11 being disposed substantially perpendicular to adjacent baffle plates 11. The space between the baffle plates 11 and the core barrel 10 is closed by a plurality of vertically spaced-apart former plates 12 which are seated in recesses 13 in the outer surfaces of the baffle plates 11 (see FIGS. 4 and 5). The baffle plates 11 are fixedly secured to the former plates 12 by a plurality of screw assemblies 15.

More specifically, referring to FIGS. 2, 4 and 5, each baffle plate 11 has a plurality of screw bores 16 formed therethrough, each having an enlarged-diameter counterbore portion 17 at the inner end thereof which defines a recessed annular shoulder 18. Each of the screw bores 16 is disposed in axial alignment with a counterbore portion 19a of an internally threaded bore 19 in the associated former plate 12. In the original construction of the nuclear reactor, a suitable screw (not shown) is inserted in the bore 16 and threadedly engaged in the bore 19, the screw having a screw head which is recessed in the counterbore portion 17 and there lock welded to the baffle plate 11.

Referring now in particular to FIGS. 2-6, there is disclosed a locking bolt apparatus 20 in accordance with the present invention, the apparatus 20 including a detent cutting tool 22 (FIG. 2), a screw 30, a locking cup 35 and a staking tool assembly 40. The screw 30 and the locking cup 35 cooperate, after operation thereon by the staking tool assembly 40, to provide a locking screw assembly 60 in accordance with the present invention.

The detent cutting tool 22 is provided at its distal end with a cutting tip 24 carrying suitable cutting members 24a. The cutting tool 22 is adapted to be rotatably mounted on a suitable support and drive mechanism (not shown) which can be lowered into the core barrel 10 for inserting the cutting tip 24 axially into the counterbore portion 17 of a screw bore 16 which has had a damaged screw removed therefrom. The cutting tool 22 is then moved radially and rotated to machine a part-spherical, radially outwardly extending lateral recess 25 in the counterbore portion 17. Any desired number of such recesses 25 may be formed. In the preferred embodiment four equiangularly spaced-apart recesses 25 are machined in the counterbore portion 17.

When the machining operation is completed the screw 30 can be inserted in the screw bore 16. The screw 30 has an elongated shank 31 provided at one end with an enlarged-diameter externally threaded portion 32. The other end of the shank 31 is provided with a radially outwardly extending annular shoulder flange 33 which preferably has a diameter slightly less than that of the counterbore portion 17 of the screw bore 16. Integral with the shoulder flange 33 and projecting axially therefrom is a hexagonal drive head 34 which has a lateral width substantially less than that of the shoulder flange 33. The locking cup 35 has a circular end wall 36 provided with a hexagonal opening 37 formed centrally therethrough. Integral with the circular end wall 36 around the outer periphery thereof and projecting therefrom coaxially therewith is a cylindrical side wall 38. Preferably, the cylindrical side wall 38 has a thickness substantially less than that of the circular end wall 36 so as to facilitate deformation thereof, as will be explained more fully below.

The hexagonal opening 37 is dimensioned to receive the drive head 34 therethrough in close fitting relationship, i.e., in a frictional or slight interference fit, with the circular end wall 36 disposed against the shoulder flange 33. Thus, if desired, the locking cup 35 can be preassembled with the screw 30 before the screw 30 is mounted in the screw bore 16. The screw 30 is inserted into the screw bore 16 and threadedly engaged in the bore 19 until the shoulder flange 33 seats firmly against the shoulder 18 of the counterbore portion 17 with whatever torque value is required, as illustrated in FIG. 4. When the parts are thus assembled, the locking cup 35 is completely recessed in the counterbore portion 17, but the cylindrical side wall 38 extends upwardly a distance sufficient to completely cover the lateral recesses 25.

The staking tool assembly 40 includes an elongated cylindrical die block 41 having a generally cylindrical bore 42 extending axially therethrough. Formed in one end of the die block 41 is a diametrical slot 43 which bifurcates the die block 41 and separates it into a pair of legs 44. Each of the legs 44 is provided with a flat part-circular bearing surface 45. Integral with the bearing surface 45 and projecting downwardly therefrom on each of the legs 44 is a die finger 46 shaped complementary to the recesses 25, each of the die fingers 46 having a downwardly and inwardly tapered inner cam surface 47 (see FIG. 5). The staking tool assembly 40 also includes an elongated cylindrical drive bolt 50 dimensioned to slidably fit in the bore 42. The drive bolt 50 has a frustonconical tapered drive end 51 in which is formed an axial bore or recess 52.

In operation, the staking tool assembly 40 is carried by a suitable drive mechanism (not shown). The die block 41 is seated against the surface of the baffle plate 11 in surrounding relationship with the counterbore portion 17 of the screw bore 16, and with the die fingers 46 extending downwardly into the counterbore portion 17 and into the locking cup 35 in positions respectively opposite the lateral recesses 25. To facilitate accurate rotational positioning of the die block 41, suitable positioning marks may be provided on the surface of the baffle plate 11. When the die block 41 has been thus positioned, the drive belt 50 is then driven axially in the direction of the arrow in FIG. 5 for driving the tapered drive end 51 into camming engagement with the cam surfaces 47 and laterally deflecting the die fingers 46 radially outwardly against the cylindrical side wall 38 of the locking cup 35, thereby deforming the side wall 38 into the recesses 25 to form a plurality of locking projections 55 (see FIG. 6) which are engaged firmly in the recesses 25. This lateral deflection of the die fingers 46 is facilitated by the bifurcation of the die block 41.

The staking tool assembly 40 is then removed and there results a completed locking assembly 60 (FIG. 6). The screw 30 is firmly threadedly engaged with the former plate 12. The locking cup 35 cooperates with the drive head 34 to prevent relative rotation of those two parts, while the engagement of the projections 55 in the lateral recesses 25 prevents any movement of the locking cup 35 with respect to the baffle plate 11. Thus, it will be appreciated that the screw 30 is securely retained against loosening rotation and, furthermore, the locking cup 35 acts securely to trap the screw drive head 34 and shoulder flange 33 to prevent accidental dislodgement thereof in the event of breakage of the shank 31, thereby resulting in an effective Class A locking device.

It is a significant aspect of the invention that the recesses 25 are disposed beneath the surface of the baffle plate 11, thereby avoiding machining of that surface which can be embrittled due to reactor core exposure. Furthermore, in the event that an error is made in the machining of one of the recesses 25, the error is easily corrected since the entire circumferential surface of the counterbore portion 17 remains for the formation of other recesses 25.

From the foregoing, it can been seen that there has been provided an improved locking screw assembly and apparatus and method for installation thereof, which is of relatively simple and economical construction, is suitable for remote underwater application, results in a Class A locking device, is suitable for use in replacing the baffle plate bolts of a nuclear reactor core barrel without machining the exposed surface of the baffle plate, and which involves relatively low risk of damage to the baffle plate or irreparable error in the installation operation.

I claim as my invention:

1. A locking screw assembly for securing together first and second structures in the internal region of a nuclear reactor core, wherein the first structure has a screw bore therethrough with a counterbore portion formed in an outer surface thereof, said assembly comprising: a lateral recess formed in the counterbore portion and spaced from said outer surfaces; an elongated screw receivable through the screw bore for threaded engagement with the second structure, said screw having an enlarged shoulder flange dimensioned for seating in the counterbore portion and for rotation with respect thereto, and an angular drive head projecting axially from said shoulder flange and having a lateral width substantially less than that of the counterbore portion; and a locking member disposed in the counterbore portion against said shoulder flange, said locking member having an angular opening therein shaped to receive said angular drive head therein for engagement with said locking member to prevent rotation with respect thereto, said locking member having a lateral projection engaged in said recess to prevent movement of said locking member with respect to the first structure.

2. The assembly of claim 1, wherein the counterbore portion has a plurality of said lateral recesses formed therein.

3. The assembly of claim 1, wherein said lateral recess is part-spherical in shape and extends radially outwardly of the counterbore portion.

4. The assembly of claim 1, wherein said drive head is hexagonal in shape.

5. The assembly of claim 4, wherein said locking member has a hexagonal opening therein for receiving said drive head therein in close fitting relationship.

6. The assembly of claim 1, wherein said locking member includes a cup-shaped member having a circular end wall with a central opening therethrough for receiving said drive head and a cylindrical side wall integral with said end wall and projecting therefrom around the entire circumference thereof coaxially therewith, said lateral projection being formed on said cylindrical side wall.

7. The assembly of claim 6, wherein said drive head is hexagonal in shape, said opening in said circular end wall being hexagonal in shape for receiving said drive head therethrough in close fitting relationship.

8. Locking screw apparatus for securing together first and second structures in the internal region of a nuclear reactor core, wherein the first structure has a screw bore therethrough with a counterbore portion formed in an outer surface thereof, said apparatus comprising: a lateral recess formed in the counterbore portion and spaced from said outer surface; an elongated screw receivable through the screw bore for threaded engagement with the second structure, said screw having an enlarged shoulder flange dimensioned for seating in the counterbore portion and rotation with respect thereto and an angular drive head projecting axially from said shoulder flange and having a lateral width substantially less than that of the counterbore portion; a locking member disposed in the counterbore portion against said flange, said locking member having an angular opening therein shaped to receive said angular drive head therein for engagement with said locking member to prevent rotation with respect thereto, said locking member having a deformable portion disposed adjacent to said lateral recess; and means for deforming said deformable portion into said recess for engagement therewith to prevent movement of said locking member with respect to the first structure.

9. The apparatus of claim 8, wherein said counterbore portion has a plurality of said lateral recesses formed therein.

10. The apparatus of claim 8, wherein said deforming means includes means movable axially of said screw for effecting the deforming operation.

11. The apparatus of claim 8, wherein said locking member includes a cup-shaped member having a circular end wall disposed against said shoulder flange and having a central opening therein for receiving said drive head, and a cylindrical side wall integral with said end wall and projecting therefrom around the entire circumference thereof substantially coaxially therewith, said side wall forming said deformable portion.

12. The apparatus of claim 11, wherein said drive head is hexagonal in shape, said opening in said circular end wall being hexagonal in shape for receiving said drive head therein in close fitting relationship.

13. The apparatus of claim 11, wherein said deforming means includes a die member engageable with the first structure and having a die portion receivable in said cup-shaped member, and a drive member movable axially of said screw within said die member for laterally moving said die portion into deforming engagement with said side wall.

14. The apparatus of claim 13, wherein said counterbore portion has a plurality of said lateral recesses formed therein, said die member being bifurcated to define two legs, each of said legs having a die portion thereon for simultaneously deforming said side wall into two of said lateral recesses.

15. The apparatus of claim 11, wherein said locking member is formed of metal.

16. The apparatus of claim 15, wherein said side wall is substantially thinner than said end wall.

17. A method for locking in place a screw which secures together first and second structures in the internal region of a nuclear reactor core, wherein the first structure has a screw bore therethrough with a counterbore portion formed in an outer surface thereof, said method comprising the steps of: forming a lateral recess in the counterbore portion and spaced from said outer surface, providing an elongated screw having an enlarged shoulder flange and an angular drive head with a lateral width substantially less than that of the counterbore portion, disposing the screw through the screw bore in threaded engagement with the second structure and with the shoulder rotatably seated in the counterbore portion, providing a locking member having an angular opening therein and disposing it in the counterbore portion against the flange with the drive head received in the opening for engagment with the locking member to prevent rotation with respect thereto, and deforming a portion of the locking member into the recess for engagement therewith to prevent movement of the locking member with respect to the first structure.

18. The method of claim 17, wherein said forming step includes a rotary cutting step.

19. The method of claim 17, wherein said forming step includes formation of a plurality of said lateral recesses in the counterbore portion.

20. The method of claim 17, wherein the deforming step includes the steps of providing a die member and positioning it adjacent to said locking member, and displacing the die member into deforming engagement with the locking member.

* * * * *